United States Patent
Dolan

(10) Patent No.: US 10,830,064 B2
(45) Date of Patent: Nov. 10, 2020

(54) HOLLOW TITANIUM AIRFOIL WITH TITANIUM COATING

(71) Applicant: United Technologies Corporation, Farmington, CT (US)

(72) Inventor: Robert C. Dolan, Coventry, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 258 days.

(21) Appl. No.: 15/620,059

(22) Filed: Jun. 12, 2017

(65) Prior Publication Data

US 2018/0355733 A1 Dec. 13, 2018

(51) Int. Cl.
| | |
|---|---|
| *F01D 5/28* | (2006.01) |
| *F01D 5/14* | (2006.01) |
| *C23D 5/00* | (2006.01) |
| *C23C 10/18* | (2006.01) |
| *C23C 4/08* | (2016.01) |
| *B23P 15/04* | (2006.01) |
| *B23K 1/20* | (2006.01) |
| *B23K 1/19* | (2006.01) |
| *B23K 35/28* | (2006.01) |
| *B23K 35/00* | (2006.01) |
| *B23K 1/00* | (2006.01) |

(Continued)

(52) U.S. Cl.
CPC ............. *F01D 5/288* (2013.01); *B23K 1/008* (2013.01); *B23K 1/0018* (2013.01); *B23K 1/19* (2013.01); *B23K 1/203* (2013.01); *B23K 1/206* (2013.01); *B23K 35/002* (2013.01); *B23K 35/0238* (2013.01); *B23K 35/286* (2013.01); *B23P 15/04* (2013.01); *B32B 15/01* (2013.01); *B32B 15/013* (2013.01); *C22C 14/00* (2013.01); *C22C 21/00* (2013.01); *C22C 21/12* (2013.01); *C23C 4/08* (2013.01); *C23C 10/18* (2013.01); *C23D 5/005* (2013.01); *F01D 5/147* (2013.01); *B21H 7/16* (2013.01); *B23K 35/0244* (2013.01); *B23K 2101/001* (2018.08); *B23K 2103/10* (2018.08); *B23K 2103/14* (2018.08); *F05D 2230/237* (2013.01); *F05D 2230/90* (2013.01); *F05D 2300/121* (2013.01); *F05D 2300/133* (2013.01)

(58) Field of Classification Search
CPC .......... B23K 2101/001; B23K 35/0244; B23K 2103/14; B21H 7/16
See application file for complete search history.

(56) References Cited

U.S. PATENT DOCUMENTS

| | | | |
|---|---|---|---|
| 3,083,448 A | 4/1963 | Moore et al. | |
| 9,765,635 B2 * | 9/2017 | Gorokhovsky | ......... C23C 28/44 |

(Continued)

FOREIGN PATENT DOCUMENTS

GB 1479855 A 7/1977

OTHER PUBLICATIONS

European Search Report for European Application No. 18177175.9 dated Nov. 20, 2018, 7 pages.

*Primary Examiner* — Joseph J Dallo
*Assistant Examiner* — Kurt Philip Liethen
(74) *Attorney, Agent, or Firm* — Cantor Colburn LLP

(57) ABSTRACT

An airfoil surface includes a first titanium portion, a second titanium portion, an aluminum alloy braze disposed there between, and a titanium coating covering the aluminum alloy braze, at least part of the first titanium portion and at least part of the second titanium portion.

20 Claims, 3 Drawing Sheets

(51) Int. Cl.
  C22C 14/00 (2006.01)
  B23K 1/008 (2006.01)
  B23K 35/02 (2006.01)
  B32B 15/01 (2006.01)
  C22C 21/12 (2006.01)
  C22C 21/00 (2006.01)
  B21H 7/16 (2006.01)
  B23K 101/00 (2006.01)
  B23K 103/10 (2006.01)
  B23K 103/14 (2006.01)

(56) References Cited

U.S. PATENT DOCUMENTS

| | | | |
|---|---|---|---|
| 2005/0058849 | A1 | 3/2005 | Raybould et al. |
| 2010/0140529 | A1* | 6/2010 | Ghasripoor .......... C23C 28/044 251/368 |
| 2012/0082559 | A1* | 4/2012 | Guglielmin ............ F01D 5/147 416/241 R |
| 2014/0241897 | A1 | 8/2014 | Bales et al. |
| 2014/0308493 | A1* | 10/2014 | Ganesh ................. C23C 28/021 428/216 |
| 2016/0069184 | A1* | 3/2016 | Ribic ................. B23K 15/0053 416/95 |
| 2016/0201186 | A1* | 7/2016 | Durham ................. C23C 14/14 428/148 |
| 2016/0201482 | A1* | 7/2016 | Parkos, Jr. ............. F01D 5/288 416/224 |

* cited by examiner

HOLLOW TITANIUM AIRFOIL WITH TITANIUM COATING

BACKGROUND

This disclosure relates to hollow airfoils and a method of coating the same.

Titanium-based alloys are widely used for structural applications in the aerospace industry. These alloys provide good fatigue properties, erosion benefits relative to aluminum alloys, and are light weight compared to steel, stainless steels, and nickel alloys. While significant weight savings can be achieved with solid titanium components, even greater weight savings can be achieved using hollow structures.

It is difficult to create a complicated airfoil shape, especially a hollow airfoil. Hollow titanium airfoils are typically produced by diffusion bonding two machined cavity-containing plates on the neutral axis, hot forming and inflating the bonded assembly to achieve its final shape within complex dies, and finally post-thermal processing the airfoil's surface to remove any surface contamination. Much of the part cost is incurred by the complex bonding and forming process.

Common practice for joining hollow titanium structures is by brazing with titanium-nickel-copper alloys or by diffusion bonding. Brazing titanium with aluminum has been used for decades, but requires a narrow window of time and temperature. This stems from the fact that aluminum and titanium can form brittle intermetallic phases at the joint interface, if time and temperature are not properly controlled. Furthermore, brazing a hollow titanium airfoil with aluminum leaves a portion of the aluminum braze material exposed on the surface of the airfoil.

SUMMARY

In one embodiment an airfoil surface includes a first titanium portion, a second titanium portion, an aluminum alloy braze disposed there between, and a titanium coating covering the aluminum alloy braze, at least part of the first titanium portion and at least part of the second titanium portion.

In a further embodiment, the first and second titanium portions are secured to one another with the aluminum alloy braze.

In a further embodiment of any of the above, the first titanium portion includes machined ribs.

In a further embodiment of any of the above, the machined ribs include undercuts that have an arcuate shape.

In a further embodiment of any of the above, the second titanium portion is a hot-formed sheet that provides a cover and the cover provides one side of the airfoil.

In a further embodiment of any of the above, the airfoil has a root and a tip defined by the first titanium portion.

In a further embodiment of any of the above, the titanium coating has a thickness of 0.0005 inches to 0.007 inches (0.0127 millimeters to 0.1778 millimeters).

In a further embodiment of any of the above, the titanium coating comprises titanium, titanium alloy, or a combination thereof.

In a further embodiment of any of the above, the titanium coating covers substantially all of the surface of the second titanium portion and at least part of the surface of the first titanium portion.

In another exemplary embodiment, a method of manufacturing an airfoil includes providing first and second titanium portions, applying an aluminum alloy braze to at least one of the first and second titanium portions, heating the first and second titanium portions to melt the aluminum alloy braze and join the first and second portions to one another to provide an airfoil surface with an aluminum alloy braze joint, and providing a titanium coating to the airfoil surface wherein the titanium coating covers the aluminum alloy braze joint, at least part of the first titanium portion, and at least part of the second titanium portion.

In a further embodiment of any of the above, the method includes machining the first titanium portion.

In a further embodiment of any of the above, the method includes applying the aluminum alloy braze before the machining step.

In a further embodiment of any of the above, the method includes pressing the second titanium portion to produce a cover that provides a side of the airfoil.

In a further embodiment of any of the above, the method includes pickling or laser cleaning the first and second titanium portions.

In a further embodiment of any of the above, the method includes applying the aluminum alloy braze after pickling or laser cleaning the first and second titanium portions.

In a further embodiment of any of the above, the method includes bagging the first and second titanium portions prior to performing the heating step.

In a further embodiment of any of the above, the method includes providing the titanium coating by cathodic arc deposition.

In a further embodiment of any of the above, the method includes the titanium coating having a thickness of 0.0005 inches to 0.007 inches (0.0127 millimeters to 0.1778 millimeters).

In a further embodiment of any of the above, the method includes the titanium coating comprising titanium, titanium alloy, or a combination thereof.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
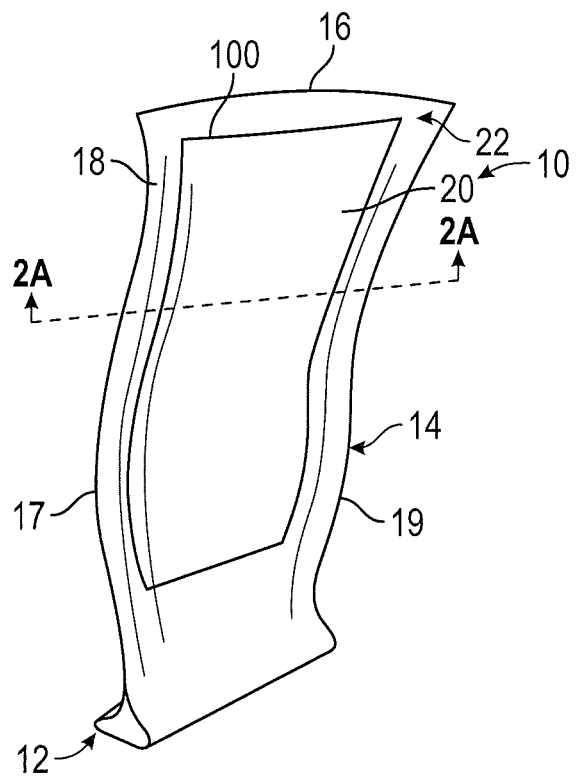
FIG. 1 is a perspective view of an example brazed titanium airfoil.

As shown and described herein, various features of the disclosure will be presented. Various embodiments may have the same or similar features and thus the same or similar features may be labeled with the same reference numeral, but preceded by a different first number indicating the Figure Number to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 2A:
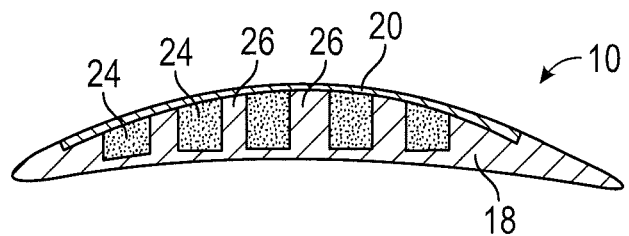
FIG. 2A is a cross-sectional view of the airfoil shown in FIG. 1 taken along line 2A-2A.
Figure 2B:
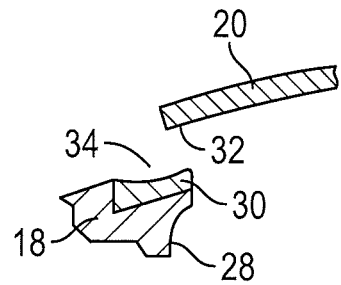
FIG. 2B is an exploded enlarged view of a portion of the airfoil shown in FIG. 2A.
Figure 3:
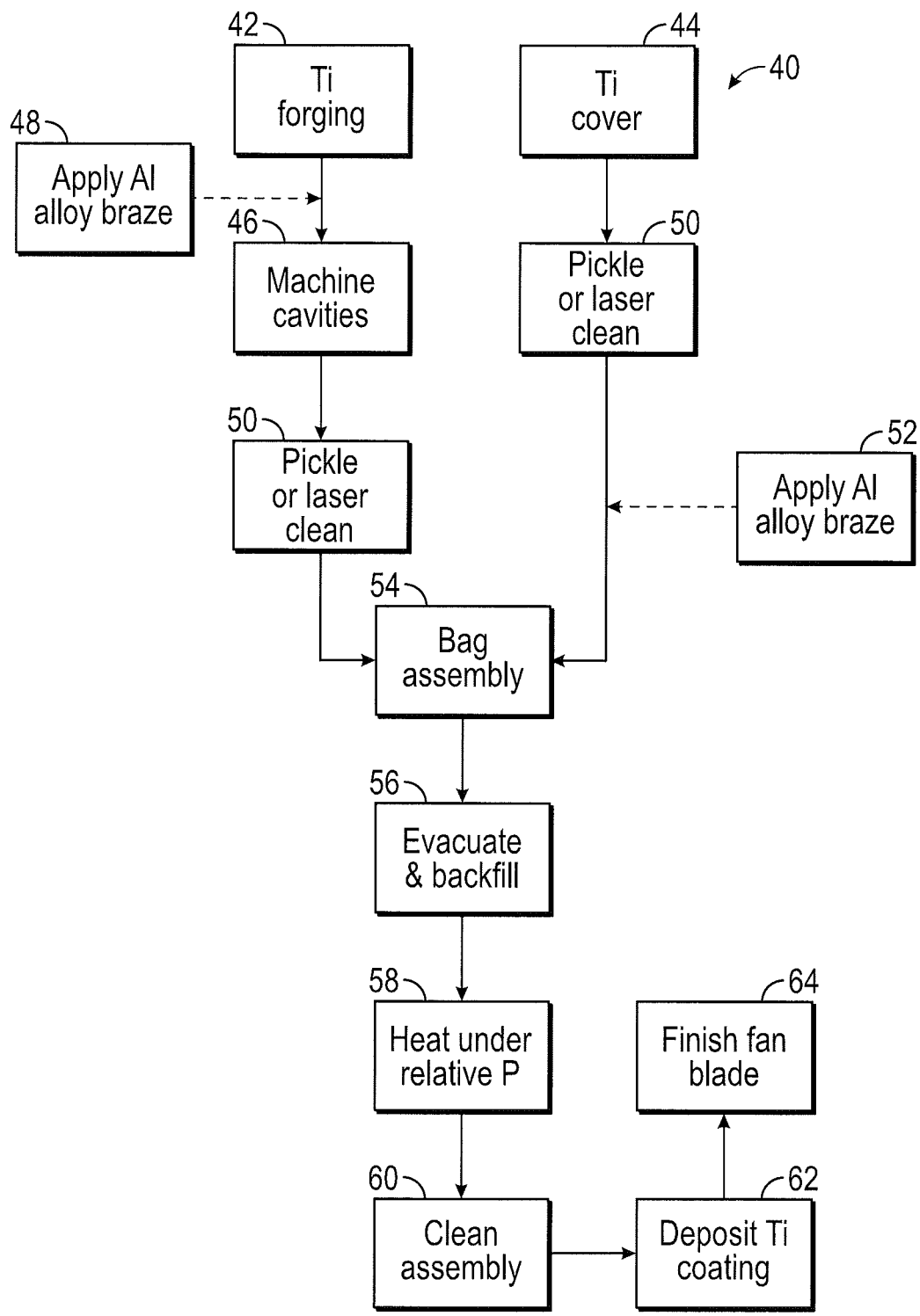
FIG. 3 is a flow chart depicting an exemplary manufacturing method for the airfoil.

An airfoil 10 is schematically depicted in FIGS. 1 and 2. The airfoil 10 includes a root 12 supporting an airfoil 14 that extends to a tip 16. First and second titanium portions 18, 20 are brazed to one another to provide an exterior contour 22 of the airfoil 10.

In the example, the first titanium portion 18 is provided by a forged blank that is machined to remove material 24. Ribs 26 are provided that have undercuts 28 with an arcuate shape and within the interior of the first titanium portion 18 to reduce weight while providing airfoil structural integrity, ensuring blade fatigue life, and supporting the airfoil cover 20. The first titanium portion 18 provides the root 12 and one side of the airfoil 14 along with the tip 16. The first portion 18 also provides first and second edges that define airfoil leading and trailing edges 17, 19.

The second titanium portion 20 provides a cover that is secured over the interior of the first titanium portion 18 by a braze 34. A titanium cover would be used for its thermal expansion match with the titanium forging, its superior corrosion resistance relative to aluminum, its improved stiffness relative to aluminum, its improved erosion resistance relative to aluminum, and its improved foreign object debris/impact resistance relative to aluminum.

The braze 34 is provided on one or both of the first and second mating surfaces 30, 32, which are respectively provided by the first and second titanium portions 18, 20. The aluminum braze results in an aluminum braze joint 100. In one example, the braze 34 is an aluminum alloy, such as Al—Cu—Mn, having less than 3 wt % copper and less than 5 wt % manganese and having a solidus-liquidus range within 1175° F.-1225° F. The aluminum or aluminum alloy chosen for brazing would be pre-placed onto either the titanium cover or the titanium forging as a photo etched pre-form or cathodic arc deposited directly onto the titanium cover or the titanium forging. In one example, the entire surface of the side of the cover being brazed or the side of the forging being brazed would be cathodic arc deposited prior to machining the forging or prior to selective etching the titanium cover to only provide braze material at areas being joined.

A method 40 of forming the airfoil 10 is schematically illustrated at 40. A titanium forging (first titanium portion 18) is provided, as indicated by block 42. The proposed method of construction uses a near net shape titanium forging with certified mechanical properties.

The titanium forging is machined, as indicated at block 46, to provide structure similar to that shown in FIGS. 1 and 2, for example. The airfoil design may be tailored such that no internal foam inserts would be needed, although inserts may be used if desired. Prior to machining (in instances where no metallic foam inserts are used), an aluminum alloy braze may be applied, as indicated at block 48. Thus, the braze will be provided only on the raised surfaces, which provides the first mating surface 30, subsequent to machining.

A titanium cover (second titanium portion 20) may be provided, as indicated at block 44. The titanium cover may be hot formed at processing conditions that ensure maintaining its certified mechanical properties, while achieving the desired shape for bonding. Alternatively, or in addition to, an aluminum alloy braze may be applied, as indicated at block 52, to the titanium cover subsequent to pickling or laser cleaning, as indicated at block 50. Pickling or laser cleaning provides a contaminant-free surface on the cover.

The cover is arranged over the titanium forging such that the first and second mating surfaces 30, 32 engage one another. The assembled airfoil 10 is inserted into a bag 64 (FIG. 4), as indicated at block 54. The bag is a metallic bag, which may be constructed from a stainless steel or a nickel alloy foil, for example, that can be sealed.

Figure 4:
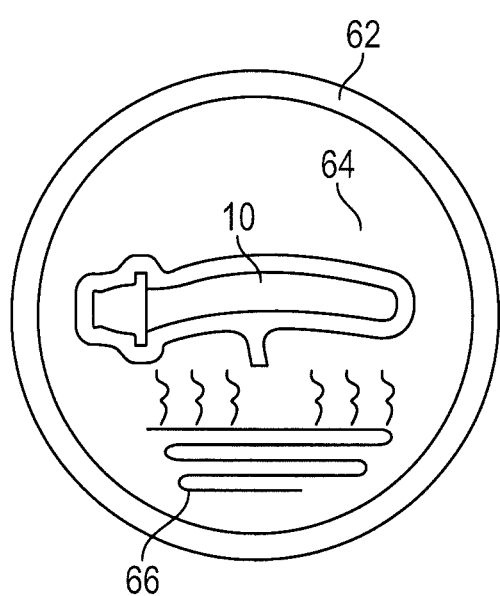
FIG. 4 schematically depicts the brazing process.

In one example, the sealed bagged airfoil is loaded into a vacuum compression brazing furnace 62 having a heating element 66, which is shown in FIG. 4. Oxygen and nitrogen within the bag are evacuated and the bag is backfilled with argon, as indicated at block 56. Evacuation and backfilling may be repeated multiple times to reduce the oxygen and nitrogen to an acceptable concentration within the bag and within the airfoil's internal cavities. Following the final evacuation, a negative atmosphere is maintained within the sealed bag. The magnitude of the bag's internal negative pressure is such that any positive pressure or vacuum external to the bag always provides force upon the titanium cover 20 and the machined airfoil 10 within the bag 64, throughout all subsequent heating, brazing and cooling.

Brazing could occur within a vacuum furnace capable of applying a positive pressure of argon, within an argon retort, within a furnace capable of maintaining a hard vacuum or within a vacuum furnace capable of maintaining a partial pressure of argon. In the first example, vacuum compression brazing furnace 62 is capable of applying a positive pressure of argon to the bagged airfoil 10 during heating to melt the aluminum alloy braze material and during subsequent cooling. If brazing within an argon retort, such an environment would be free of both oxygen and nitrogen to the extent acceptable for producing a finished product within the design criteria but meeting or bettering specified surface contamination requirements. If in a standard vacuum furnace, brazing would be accomplished by heating parts in a retort or other line-of-sight shielding at 5×10−4 torr or lower pressure within a temperature range of 1225° F. to 1290° F. Regardless of the furnace choice, time between 1175° F. on heating and 1175° F. on cooling would be controlled to produce a braze microstructure that conforms to metallurgical standards established by material characterization testing and airfoil component testing. Such standards would control amount of particulate, titanium aluminide, and eutectic intermetallic structure within the braze. Because the aluminum brazing temperature is lower than annealing temperatures used for titanium alloys such as Ti-6-4 and Ti-6-2-4-2, certified mechanical properties of the airfoil cover 20 and the airfoil forging 18 previously created during prior plate/sheet rolling, airfoil forging, and associated follow-on heat treatment will be maintained throughout all aluminum brazing thermal processing.

After brazing the airfoil surface comprises aluminum alloy braze at the joint formed by the first titanium portion and the second titanium portion. The airfoil surface at the aluminum braze joint is cleaned at block 60. Prior to coating the surface may be wiped with solvent, typically alcohol, to ensure that the surface to be coated is clean. The airfoil surface is coated with titanium to cover the exposed aluminum alloy braze as indicated at block 62. The titanium coating may also cover at least part of the surface of the first titanium portion. The titanium coating may also cover at least part of the surface of the second titanium portion. In some embodiments the titanium coating covers all or substantially all (greater than 90%) of the surface of the second titanium portion and at least part of the surface of the first titanium portion.

The titanium coating is deposited by cathodic arc deposition. The titanium coating may have a thickness of 0.0005 inches to 0.007 inches (0.0127 millimeters to 0.1778 millimeters), or, 0.0005 inches to 0.0015 inches (0.0127 millimeters to 0.0381 millimeters). The titanium coating may comprise titanium, a titanium alloy, or both. The titanium coating may comprise the same material as the first titanium portion, the second titanium portion or both.

The airfoil is then finished, if necessary, as indicated at block 64.

Coating the aluminum braze joint with a titanium coating protects the aluminum braze joint from degradation and helps to maintain the integrity of the airfoil.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. An airfoil surface comprising a first titanium portion, a second titanium portion, an aluminum alloy braze disposed there between, and a titanium coating disposed on and covering the aluminum alloy braze, at least part of the first titanium portion and at least part of the second titanium portion.

2. The airfoil surface of claim 1, wherein the first and second titanium portions are secured to one another with the aluminum alloy braze.

3. The airfoil surface of claim 1, wherein the first titanium portion includes machined ribs.

4. The airfoil surface of claim 1, wherein the machined ribs include undercuts that have an arcuate shape.

5. The airfoil surface of claim 1, wherein the second titanium portion is a hot-formed sheet that provides a cover and the cover provides one side of the airfoil.

6. The airfoil surface of claim 1, wherein the airfoil has a root and a tip defined by the first titanium portion.

7. The airfoil surface of claim 1, wherein the titanium coating has a thickness of 0.0005 inches to 0.0015 inches (0.0127 millimeters to 0.0381 millimeters).

8. The airfoil surface of claim 1, wherein the titanium coating comprises titanium, a titanium alloy, or a combination thereof.

9. The airfoil surface of claim 1, wherein the titanium coating covers substantially all of the surface of the second titanium portion and at least part of the surface of the first titanium portion.

10. A method of manufacturing an airfoil comprising providing first and second titanium portions, applying an aluminum alloy braze to at least one of the first and second titanium portions, heating the airfoil to melt the aluminum alloy braze and join the first and second portions to one another to provide an airfoil surface with an aluminum alloy braze joint; and providing a titanium coating to the airfoil surface, wherein the titanium coating is disposed on and covers the aluminum alloy braze joint, at least part of the first titanium portion, and at least part of the second titanium portion.

11. The method of claim 10, wherein the method further comprises machining the first titanium portion.

12. The method of claim 10, wherein the method further comprises applying the aluminum alloy braze before the machining step.

13. The method of claim 10, wherein the method further comprises pressing the second titanium portion to produce a cover that provides a side of the airfoil.

14. The method of claim 10, wherein the method further comprises pickling or laser cleaning the first titanium portion, the second titanium portion or both.

15. The method of claim 14, wherein the method comprises applying the aluminum alloy braze after pickling or laser cleaning.

16. The method of claim 10, wherein the method further comprises bagging the first and second titanium portions prior to performing the heating step.

17. The method of claim 10, wherein the method further comprises providing the titanium coating by cathodic arc deposition.

18. The method of claim 10, wherein the titanium coating has a thickness of 0.0005 inches to 0.007 inches (0.0127 millimeters to 0.1778 millimeters).

19. The method of claim 10, wherein the titanium coating comprises titanium, titanium alloy, or a combination thereof.

20. The airfoil surface of claim 1, wherein the aluminum alloy braze is an Al—Cu—Mn alloy.

* * * * *